US012600318B2

(12) United States Patent
Hong et al.

(10) Patent No.: US 12,600,318 B2
(45) Date of Patent: Apr. 14, 2026

(54) VEHICLE SENSOR DEVICE AND SEAT BELT RETRACTOR EMPLOYING SAME

(71) Applicant: Autoliv Development AB, Vargarda (SE)

(72) Inventors: Hyeon Ki Hong, Hwaseong-si (KR); Chan Ki Moon, Hwaseong-si (KR)

(73) Assignee: Autoliv Development AB, Vargarda (SE)

( * ) Notice: Subject to any disclaimer, the term of this patent is extended or adjusted under 35 U.S.C. 154(b) by 145 days.

(21) Appl. No.: 18/567,874

(22) PCT Filed: Apr. 15, 2022

(86) PCT No.: PCT/KR2022/005479
§ 371 (c)(1),
(2) Date: Dec. 7, 2023

(87) PCT Pub. No.: WO2022/265212
PCT Pub. Date: Dec. 22, 2022

(65) Prior Publication Data
US 2024/0278746 A1     Aug. 22, 2024

(30) Foreign Application Priority Data
Jun. 15, 2021     (KR) ........................ 10-2021-0077564

(51) Int. Cl.
B60R 22/46          (2006.01)
B60R 22/40          (2006.01)
(52) U.S. Cl.
CPC .............. B60R 22/46 (2013.01); B60R 22/40 (2013.01)

(58) Field of Classification Search
CPC ....... B60R 22/40; B60R 22/405; B60R 22/44; B60R 22/32; B60R 2022/403; B60R 2022/402; B60R 2022/40
(Continued)

(56) References Cited

U.S. PATENT DOCUMENTS 3,995,788 A * 12/1976 Stephenson ............. B60R 22/40
                                                         242/384.4
4,090,678 A * 5/1978 Yamanashi ........... B60R 22/343
                                                         242/384
(Continued)

FOREIGN PATENT DOCUMENTS

CN           103930316 A *  7/2014 ............. B60R 22/40
JP      2002-234417 A      8/2002
(Continued)

*Primary Examiner* — Victoria P Augustine
*Assistant Examiner* — Ermia E. Melika
(74) *Attorney, Agent, or Firm* — Dickinson Wright PLLC

(57)                ABSTRACT
The present invention pertains to a vehicle sensor device and a seat belt retractor employing same, the vehicle sensor device comprising: a body forming the outer appearance thereof; a cover coupled to one opened surface of the body; a sensor housing rotatably installed in the body according to the inclination of a backrest and the installation angle of the body; a ball installed in the sensor housing and detecting the inclination of a vehicle and the change of acceleration; and a sensor lever disposed over the ball and having one end rotatably coupled to the sensor housing, wherein the sensor lever is configured to allow a pilot lever provided in a locking device to linearly reciprocate by a rotational movement according to the movement of the ball so that the sensor lever is installed in the senser housing in which the ball is installed.

8 Claims, 10 Drawing Sheets

(58) Field of Classification Search
USPC ............. 242/384, 384.1, 384.2, 384.4, 384.6
See application file for complete search history.

(56) References Cited

U.S. PATENT DOCUMENTS

| | | | | |
|---|---|---|---|---|
| 4,193,566 A * | 3/1980 | Inukai ..................... | B60R 22/40 | 242/382.5 |
| 4,331,304 A * | 5/1982 | Matsuoka ............... | B60R 22/40 | 242/384.6 |
| 4,556,177 A * | 12/1985 | Kuwakado .............. | B60R 22/40 | 242/384.4 |
| 4,978,087 A * | 12/1990 | Tauber .................... | B60R 22/40 | 242/384.6 |
| 5,495,994 A * | 3/1996 | Rumpf .................... | B60R 22/40 | 242/384.6 |
| 6,164,581 A * | 12/2000 | Freeman ................. | B60R 22/40 | 297/480 |
| 6,443,382 B1 | 9/2002 | Bae | | |
| 6,499,554 B1 | 12/2002 | Yano et al. | | |
| 10,793,104 B2 | 10/2020 | Jabusch et al. | | |

FOREIGN PATENT DOCUMENTS

| | | | |
|---|---|---|---|
| JP | 2014-019365 A | | 2/2014 |
| KR | 10-0475591 B1 | | 3/2005 |
| KR | 10-2016-0055151 A | | 5/2016 |
| KR | 10-1766844 B1 | | 8/2017 |
| KR | 10-2024048 B1 | | 9/2019 |

* cited by examiner

VEHICLE SENSOR DEVICE AND SEAT BELT RETRACTOR EMPLOYING SAME

TECHNICAL FIELD

The disclosure relates to a seat belt retractor, and more particularly, to a vehicle sensor device which senses changes in inclination and acceleration of a vehicle and prevents a seat belt from being pulled out, and a seat belt retractor employing the same.

BACKGROUND ART

In general, a vehicle is equipped with a seat belt safety device in a seat to ensure the safety of an occupant.

The seat belt safety device includes a retractor which operates to allow a band-shaped seat belt webbing (hereinafter, referred to as a "webbing") for fixing an occupant to be wound on a spool, or to be pulled out, and a buckle into which a tongue fixed at one end of the webbing is removably inserted.

The retractor prevents an occupant wearing the seat belt from being bounced forward or moved away from a seat due to driving inertia when the vehicle suddenly stops or accelerates due to a vehicle accident. Such a retractor may include a device that allows the webbing to be pulled out in a normal state when the occupant wears the seat belt, but, when a change in the pull-out acceleration of the webbing or the inclination of the vehicle is detected due to a vehicle collision, prevents the webbing from being further pulled out, and an emergency tensioning device and a pretensioning device that reduce looseness or hanging of the webbing, that is, slack of the webbing.

For example, in Patent Document 1 and Patent Document 2 below, a retractor technique for controlling winding and unwinding operations of a seat belt webbing is disclosed.

Meanwhile, when an acceleration exceeding a predetermined value is applied to the retractor in the horizontal direction or the inclination of the vehicle is changed, such as when the vehicle collision occurs, a vehicle sensor that detects the acceleration or inclination is applied to the retractor to prevent the seat belt from being pulled out by operating a locking device of the seat belt.

A vehicle sensor using a ball as an inertial member or an independent inertial member is generally known in the art.

For example, the vehicle sensor includes an inertial member that moves in a dangerous situation where a deceleration higher than a normal deceleration of the webbing or an inclination is applied to the vehicle, and a sensor lever that interworks with external teeth of a control disc which is moved by the inertia member and rotates together with a spool of the seat belt retractor.

Such a seat belt retractor may be mounted in a vehicle body, for example, a center pillar of the vehicle, a backrest of a seat, a rear pillar, etc. Accordingly, a mounting posture of the seat belt retractor may be variously changed according to a structure of the center pillar, the backrest of the seat, the rear pillar, etc. That is, the seat belt retractor is not always mounted in the horizontal state, and may be mounted in a state in which it is inclined from the horizontal state by a predetermined angle in a left-right direction or a front-rear direction.

In particular, when the seat belt retractor is installed in the backrest of the seat, the inclination of the seat belt retractor may be changed according to rotation of the backrest.

However, if the posture of the related-art seat belt retractor is changed over a certain range, the acceleration and the inclination cannot be properly detected.

For example, when the seat belt retractor having the vehicle sensor has a posture that is inclined from the horizontal state over a certain range, a distance between the control disc and the sensor lever of the vehicle sensor becomes too close, so the sensor lever operates sensitively, so that the locking operation cannot be properly performed.

In addition, when the seat belt retractor having the vehicle sensor is mounted in the backrest of the seat, and the backrest of the seat is inclined toward the front side of the vehicle, the sensor lever of the vehicle sensor is caught by the external teeth of the control disc, thereby restricting the rotation of the spool.

For this reason, when an occupant wants to wear the seat belt, it may not be possible to wear the seat belt because the rotation of the spool is restricted.

In order to solve the above problems, the applicant of the present invention has filed a patent application that discloses a seat belt retractor having a vehicle sensor with an improved fixing structure in Patent Document 3 below, which is now registered.

Meanwhile, as autonomous vehicles are developing recently, a technology for minimizing volumes of a seat applied to a vehicle and a seat belt retractor is developing.

In addition, an integrated seat belt (Belt In Seat (BIS)) that is integrated into a seat may be applied.

The vehicle sensor of the related-art seat belt retractor measures the inclination of a vehicle by applying a gimbal having a weight therein.

Such a vehicle sensor may measure the inclination of the vehicle even if the angle of the backrest provided on the seat is changed.

However, when the seat in which the related-art seat belt retractor is installed, for example, a rotation angle of the backrest, exceeds a predetermined angle range, the sensor lever connected with the gimbal may not properly control a pilot lever, causing a problem that it is impossible to perform a normal operation.

Accordingly, there is a need for development of a seat belt retractor employing a vehicle sensor, which can extend an angle range in which a normal operation is possible, by minimizing an abnormal operation range caused by rotation of a backrest.

(Patent Document 1) U.S. Pat. No. 6,499,554 (registered on Dec. 31, 2002)

(Patent Document 2) U.S. Pat. No. 6,443,382 (registered on Sep. 3, 2002)

(Patent Document 3) Korean Patent Registration No. 10-1766844 (issued Aug. 9, 2017)

DISCLOSURE OF INVENTION

Technical Problem

An object of the disclosure is to solve the above-described problems, and is to provide a vehicle sensor device for sensing changes in inclination and acceleration of a vehicle, and a seat belt retractor employing the same.

Another object of the disclosure is to provide a vehicle sensor device which can extend an angle range in which a normal operation is possible by controlling a pilot lever regardless of a rotation angle and an installation angle of a backrest, and a seat belt retractor employing the same.

Still another object of the disclosure is to provide a vehicle sensor device which can detect an inclination of a vehicle and an angle of a seat backrest by applying one ball, and a seat belt retractor employing the same.

Solution to Problem

To achieve the above-described objects, a vehicle sensor device according the disclosure may include: a body that forms an external appearance; a cover coupled to an opened one surface of the body; a sensor housing rotatably installed in the body according to an installation angle of the body and an inclination of an backrest; a ball installed inside the sensor housing to sense changes in the inclination and acceleration of the vehicle; and a sensor lever disposed on an upper portion of the ball and having one end rotatably coupled to the sensor housing, and the sensor lever may linearly reciprocate a pilot lever provided in a locking device by a rotation action according to movement of the ball.

In addition, to achieve the above-described objects, a seat belt retractor equipped with a vehicle sensor device according the disclosure may include: a vehicle sensor device to sense changes in inclination and acceleration of a vehicle; a spindle device having a spindle on which a seat belt webbing is wound; and a locking device that performs a locking operation to prevent the seat belt webbing from being pulled out upon vehicle collision, and a pilot lever may be linearly reciprocated to be engaged with or disengaged from the locking device according to the sensed change in inclination and acceleration of the vehicle.

Advantageous Effects of Invention

As described above, the vehicle sensor device and the seat belt retractor employing the same according to the disclosure may sense changes in inclination and acceleration of a vehicle and change in inclination of a backrest by using the ball and the sensor housing, and may control the pilot lever by rotating the sensor lever.

That is, according to the disclosure, the sensor lever may be installed on an upper portion of the ball, and, by rotating the sensor lever about the rotating shaft coupled to the sensor housing by movement of the ball according to changes in acceleration and inclination of the vehicle, the pilot lever connected with the sensor lever may be linearly reciprocated.

Accordingly, the disclosure may control the ability to pull out the webbing by making the pilot lever protrude to the outside of the cover and engaging or disengaging the pilot lever to or from the locking device.

In particular, according to the disclosure, the spherical part may be provided on the pilot lever, and may be rotatably coupled to an upper portion of the sensor lever, so that the pilot lever may be normally controlled to linearly reciprocate regardless of an angle at which the sensor device is rotated and disposed by adjusting an angle of the seat backrest.

That is, according to the disclosure, the pilot lever may be normally controlled according to an arrangement angle of the sensor device which is changed by adjusting an angle of a backrest of a seat within a range from 10° in a forward direction to 90° in a rearward direction with reference to a reference position.

BEST MODE FOR CARRYING OUT THE INVENTION

Hereinafter, a vehicle sensor device and a seat belt retractor employing the same according to preferred embodiments of the disclosure will be described in detail with reference to the accompanying drawings.

Prior to explaining a configuration of the seat belt retractor according to preferred embodiments of the disclosure, a configuration of a seat belt retractor according to related-art technology will be roughly explained with reference to FIG. 1.

Figure 1:
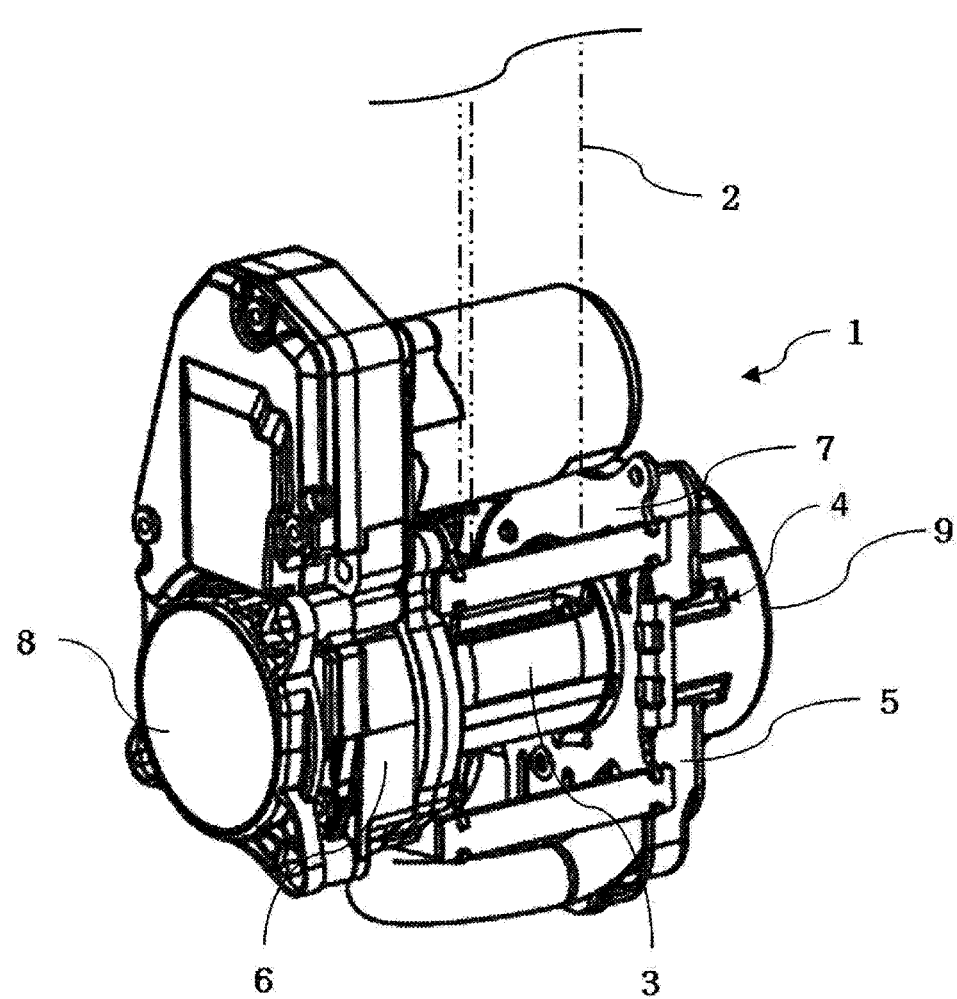
FIG. 1 is a view illustrating an example of a related-art seat belt retractor.

FIG. 1 is a view illustrating an example of a related-art seat belt retractor.

As shown in FIG. 1, the related-art seat belt retractor 1 may include a spindle 3 on which a seat belt webbing (hereinafter, referred to as a 'webbing') 2 is wound, a sensor unit 4 that detects an inclination of the vehicle, an emergency tensioning unit 5 that reduces slack by winding the webbing 2 upon a vehicle collision, and a pretensioning unit 6 that smoothly pulls out the webbing 2 during normal driving of the vehicle and reduces slack by winding the webbing 2 just before a vehicle collision.

The sensor unit 4 detects a change in the pull-out acceleration of the webbing or a change in the inclination of the vehicle caused by a vehicle collision.

The emergency tensioning unit 5 may operate an inflater (not shown) having gunpowder embedded therein according to a detection signal that detects a vehicle collision, and may wind the webbing 2 on the spindle 3 by using a pressure of a generated gas. Accordingly, the emergency tensioning unit 5 may reduce an injury value of a passenger by reducing slack of the webbing 2 by winding the webbing 2 upon a vehicle collision.

When a vehicle collision is predicted through a sensor applied to the vehicle, the pretensioning unit 6 may wind the webbing 2 on the spindle by operating a motor which is capable of rotation and reverse rotation. That is, when the vehicle travels normally, the pretensioning unit 6 may keep the tension of the worn webbing 2 and prevent the webbing 2 from being loosened until a stronger acceleration or deceleration of the vehicle occurs even if there is no accident, and may reduce an injury value of a passenger by reducing slack of the webbing 2 by winding the webbing 2 just before a vehicle collision.

Herein, the spindle 3 is installed inside a fixing frame 7, and the sensor unit 4, the emergency tensioning unit 5, and the pretensioning unit 6 are disposed on both sides of the fixing frame 7, and left and right housings 8, 9 are coupled to the outside of each unit.

That is, the respective units 4, 5, 6 are disposed on both sides of the spindle 2 along a traverse direction.

In the related-art seat belt retractor 1 described above, the spindle is installed in the backrest of the seat along a width direction, that is, a left-right direction. Therefore, as the length of the webbing 2 wound on the spool increases, a thickness in a front-rear direction (hereinafter, referred to as a 'thickness') also increases, and hence, there is a problem that it is difficult to apply the seat belt retractor to a backrest of a slim seat.

To solve this problem, the disclosure minimizes a thickness of a seat belt retractor by rotating an installation direction of a spindle on which a webbing is wound, thereby applying the seat belt retractor to a slim seat.

Along this, the disclosure can solve a problem of insecure connection between a sensor lever and a pilot lever, which arises according to a rotation angle of a gymbal, by enhancing a structure of a vehicle sensor device.

Hereinafter, a configuration of a seat belt retractor employing a vehicle sensor device according to a preferred embodiment of the disclosure will be described with reference to FIGS. 2 to 3.

In the following description, a direction in which a steering wheel is installed with reference to a seat, a traveling direction of a vehicle is referred to as a "forward direction, and the opposite direction thereof is referred to as a "rearward direction". In addition, terms indicating directions such as 'left side,' 'right side,' 'upward direction,' and 'downward direction' are defined to indicate respective directions with reference to the forward direction and the rearward direction described above.

Accordingly, an X-axis direction in each drawing corresponds to a forward direction, a Y-axis direction corresponds to a right side, and a Z-axis direction corresponds to an upward direction.

Figure 2:
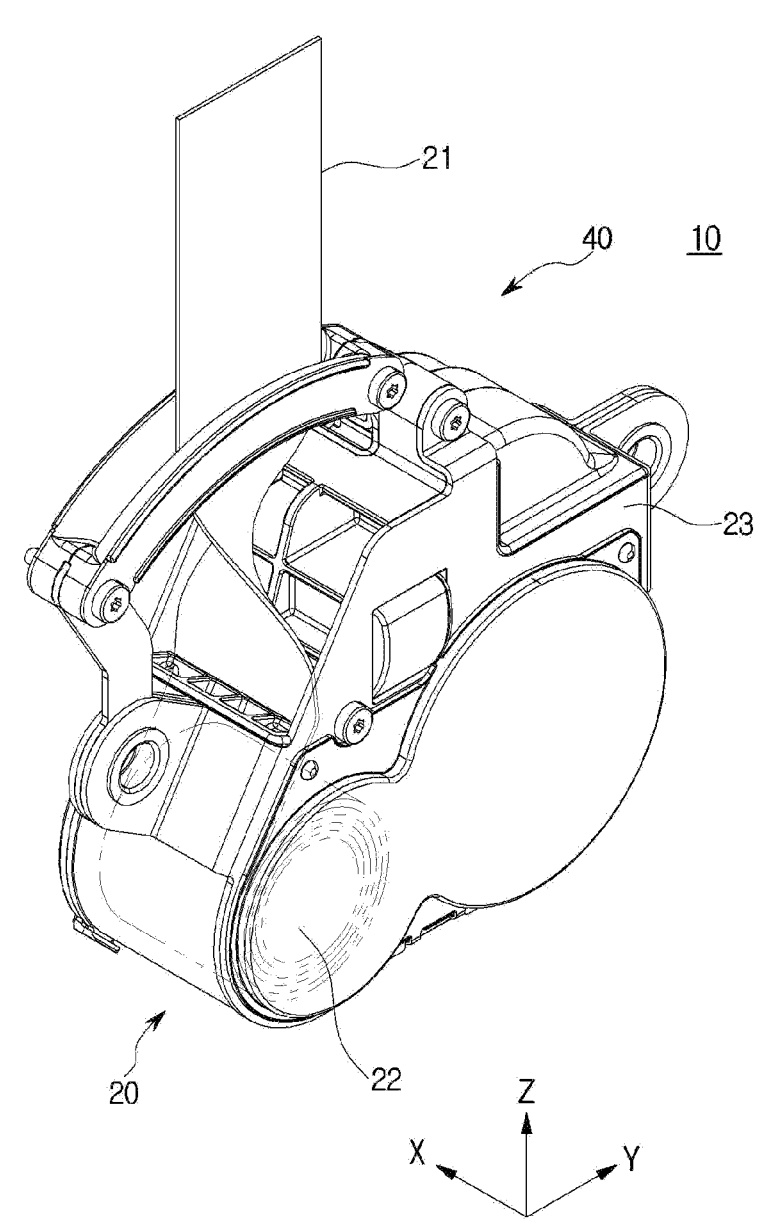
FIG. 2 is a perspective view of a seat belt retractor employing a vehicle sensor device according to a preferred embodiment of the disclosure.
Figure 3:
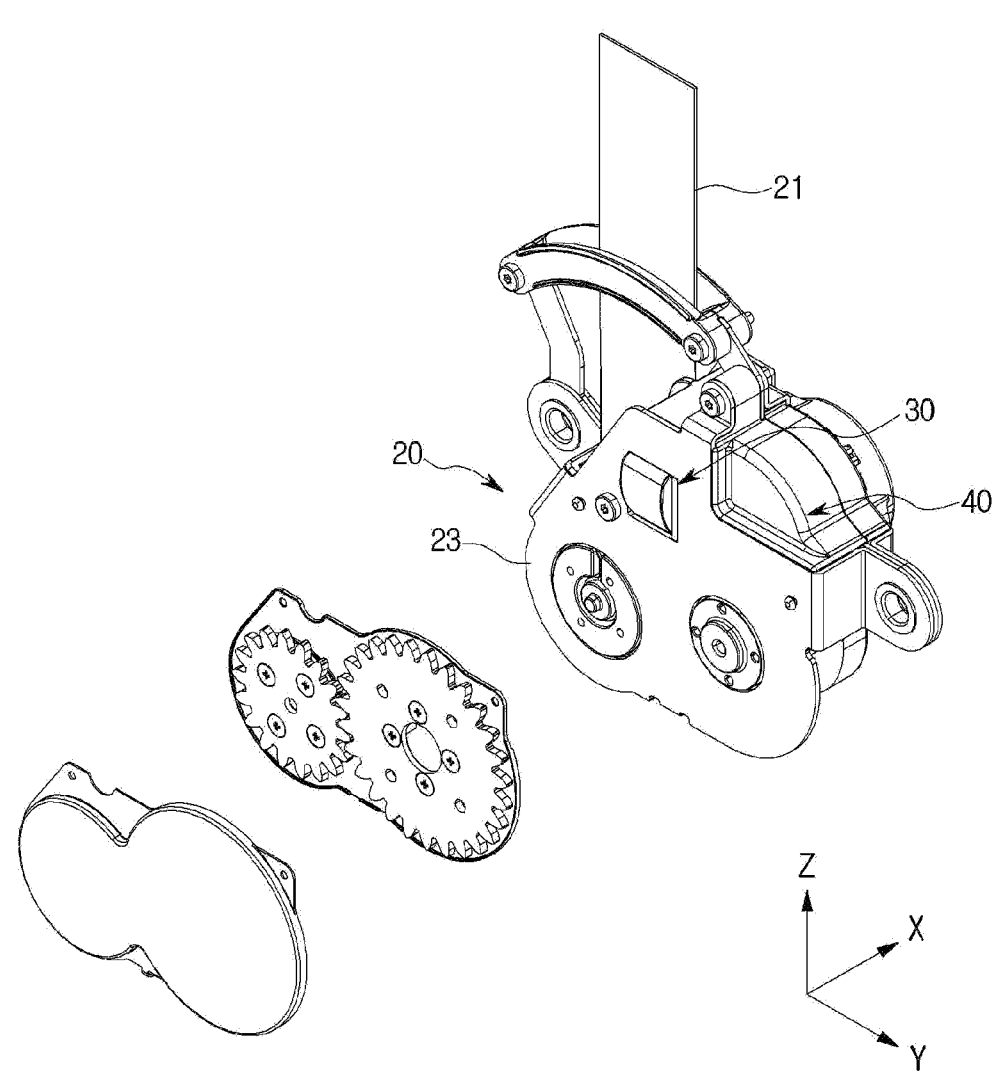
FIG. 3 is a partial exploded perspective view of the seat belt retractor shown in FIG. 2.

FIG. 2 is a perspective view of a seat belt retractor employing a vehicle sensor device according to a preferred embodiment of the disclosure, and FIG. 3 is a partial exploded perspective view of the seat belt retractor shown in FIG. 2.

In the present embodiment, a configuration of a seat belt retractor applied to an integrated seat belt (BIS) that is integrally mounted in a seat will be described.

Of course, the disclosure is not limited thereto, and it should be noted that seat belt retractors of various structures and shapes may be provided to be applied not only to an integrated seat belt but also to a normal vehicle or an autonomous vehicle.

As shown in FIGS. 2 and 3, a seat belt retractor 10 employing a vehicle sensor device according to a preferred embodiment of the disclosure may include a spindle device 20, a vehicle sensor device (hereinafter, referred to as a 'sensor device') 30, and a locking device 40.

Along with these, the seat belt retractor 10 may further include a pretensioning device that reduces slack by winding a webbing 21 just before a vehicle collision.

The spindle device 20 and the sensor device 30 are basic modules that constitute the seat belt retractor 10, and may be fabricated as separate modules and assembled, or may be integrated into one module and provided.

The spindle device 20 is provided with a spindle 22 on which the webbing 21 is wound, and the spindle device and the sensor device may be installed inside a housing 23.

The sensor device 30 may include an acceleration sensor that detects a change in the pull-out acceleration of the webbing 21, or an inclination sensor that detects a change in the inclination of the vehicle.

In the present embodiment, a configuration of the sensor device 30 employing an inclination sensor to sense a change in inclination of a vehicle will be described in detail with reference to FIGS. 4 to 6. The sensor device 30 may sense not only a change in inclination of a vehicle but also a change in acceleration.

Figure 4:
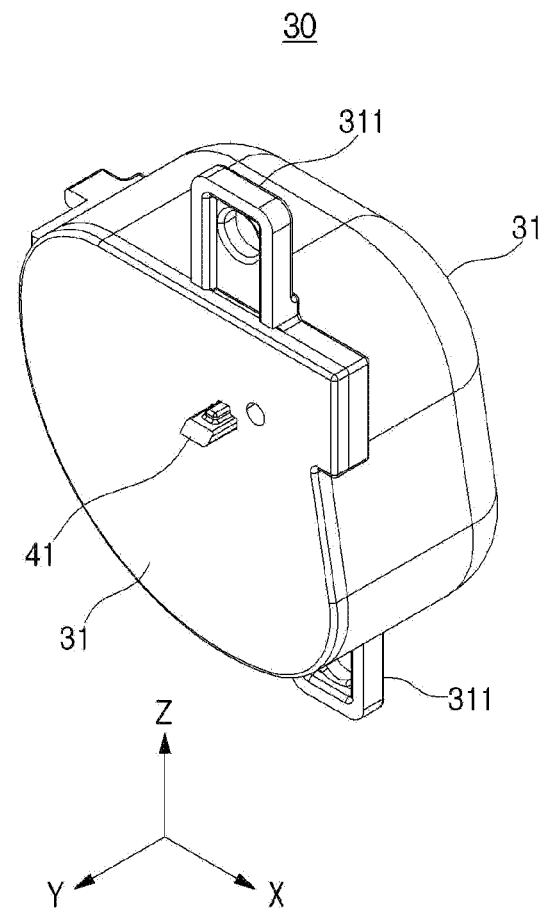
FIG. 4 is an enlarged view of the sensor device shown in FIG. 2.
Figure 5:
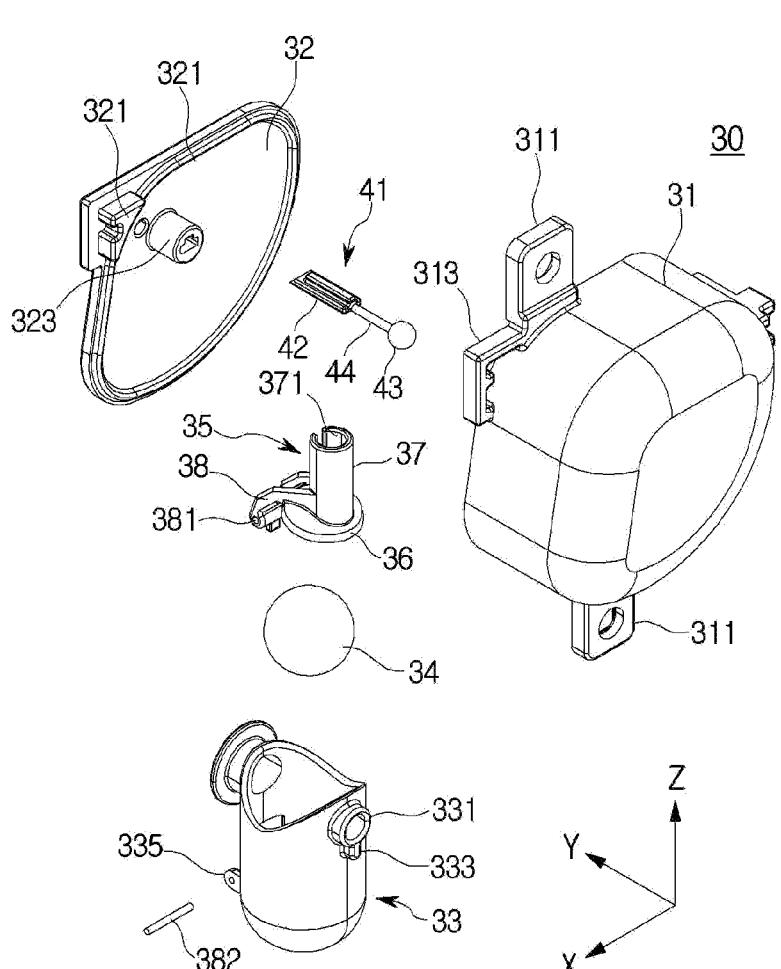
FIGS. 5 and 6 are exploded perspective views of the sensor device shown in FIG. 4.
Figure 6:
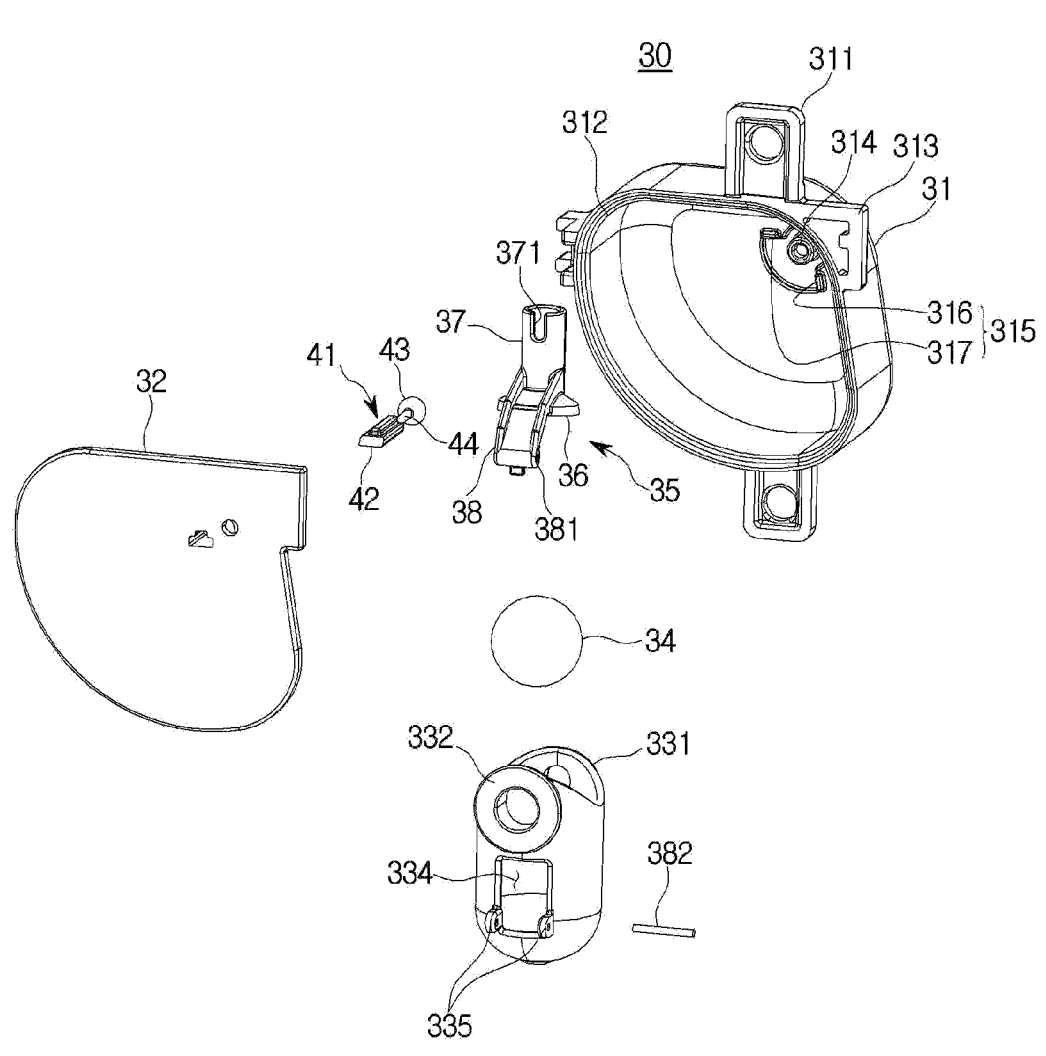

FIG. 4 is an enlarged view of the sensor device shown in FIG. 2, and FIGS. 5 and 6 are exploded perspective views of the sensor device shown in FIG. 4.

In the present embodiment, a configuration of a sensor device applied to the configuration of the seat belt retractor shown in FIGS. 2 to 3 will be explained.

Of course, the disclosure is not limited to the above-described configuration, and it should be noted that the disclosure may be changed to be applied to seat belt retractors having various configurations such as the seat belt retractor, etc. shown in FIG. 1.

As shown in FIGS. 4 to 6, a vehicle sensor device (hereinafter, referred to as a "sensor device") 30 applied to the seat belt retractor 10 according to a preferred embodiment of the disclosure include a body 31 that forms an external appearance, a cover 32 that is coupled to an opened one surface of the body 31, a sensor housing 33 that is rotatably installed in the body 31 according to an installation angle of the body 31 and an inclination of a backrest, a ball 34 that is installed inside the sensor housing 33 to sense changes in the inclination and acceleration of the vehicle in which the sensor device 30 is installed, and a sensor lever 35 that is disposed on an upper portion of the ball 34 and has one end rotatably coupled to the sensor housing 33 to move a pilot lever 41 by a rotation action according to movement of the ball 34.

The body 31 may have one surface opened, and may be formed in a cylindrical shape having a substantially rectangular or triangular cross section when viewed from a side.

A pair of fixing protrusion parts 311 may protrude from an upper end and a lower end of the body 31 to fix the body 31, respectively, to the spindle device 20 by securing with a bolt, etc.

A coupling rib 321 may protrude from one surface of the cover 32 toward the body 31 along an edge, and a coupling recess part 312 may be formed along an edge of an opening of the body 31 to be stepped from an outer surface of the opening to be coupled with the coupling rib 321.

A coupling protrusion part 322 may protrude from a front end of the cover 32 toward the body 31, and a coupling recess part 313 may be formed on a front end of the body 31 to be coupled with the coupling protrusion part 322.

A through-hole part 323 may protrude from the cover 32 toward the body 31 to allow the pilot lever 41 to pass and to linearly reciprocate therethrough.

The body 31 and the cover 32 may be disposed along an installation direction of the spindle 22, that is, along the X-axis direction, while being coupled to each other.

The pilot lever 41 linearly reciprocates along the Y-axis direction by a rotation action of the sensor lever 35.

That is, when the pilot lever 41 moves to the right as viewed on FIG. 5, a right end of the pilot lever 41 is engaged with any one of a plurality of protrusions formed on an outer circumference of a steering disk (not shown) provided in the locking device 40, so that the locking device 40 performs a locking operation to prevent the webbing 21 from being pulled out.

On the other hand, when the pilot lever 41 moves to the left, the pilot lever 41 and the locking device 40 are disengaged from each other, so that the webbing 21 may be freely pulled out.

The sensor housing 33 may be formed in a substantially cylindrical shape with an opened upper surface so that an installation space is formed in the sensor housing and the ball 34 is installed in the installation space to move according to a change in inclination of a vehicle. A lower surface of the sensor housing 33 may be curved to be downwardly convex to correspond to a lower portion of the ball 34.

The sensor housing 33 may be provided at a left side and a right side of an upper end thereof with a first coupling part 331 to which a rotating shaft part 314 of the body 31 is coupled, and a second coupling part 332 coupled to the through-hole part 323 of the cover 32, respectively.

Therefore, the sensor housing 33 may perform a rotation action in forward and rearward directions with reference to the first and second coupling parts 331, 332.

The first coupling part 331 may allow the rotating shaft part 314 to be coupled to an inside thereof, and may have an inner diameter corresponding to an outer diameter of the rotating shaft part 314.

The second coupling part 332 may allow the through-hole part 323 to be coupled to an inside thereof, and may have an inner diameter corresponding to an outer diameter of the through-hole part 323.

Herein, the rotating shaft part 314 protrudes from an inner surface of a left sidewall of the body 31 toward the cover 32, and functions as a rotating shaft to allow the sensor housing 33 to rotate thereabout.

An angle limiting part 315 may be formed in the proximity of the rotating shaft part 314 to limit a rotation angle of the sensor housing 33.

The angle limiting part 315 may include a first stopper 316 for limiting a forward rotation angle of the sensor housing 33 rotating about the rotating shaft part 314, and a second stopper 317 for limiting a rearward rotation angle of the sensor housing 33.

Herein, positions of the first and second stoppers 316, 317 may be set limit a rotation angle of the sensor housing 33 to a rotation angle of the backrest.

For example, an upper end of the backrest may rotate by about 10° in forward and downward directions with reference to a lower end of the backrest, and may rotate by about 90° to the maximum in reward and downward directions.

Therefore, the first stopper 316 may be formed at a position where a fixing protrusion 333 formed at a lower end of the first coupling pat 331 of the sensor housing 33 rotates by about 10° in a forward direction, and the second stopper 317 may be formed at a position where the fixing protrusion 333 rotates by about 90° in a rearward direction.

However, the disclosure is not limited thereto and a rotation angle may be variously adjusted by adjusting positions of the first and second stoppers.

For example, the disclosure may be modified that the first stopper may be formed at a position rotated by about 90°, so that the fixing protrusion of the first coupling part may rotate by about 90° in the forward direction.

In addition, it is illustrated in the present embodiment that the sensor housing 33 performs a rotation action, but in practice, the body 31 and the cover 32 may perform a rotation action according to a rotation angle of the backrest, and the sensor housing 33 may always remain vertically positioned due to the weight of the ball 34.

The ball 34 may be disposed in an inner installation space of the sensor housing 33, and may have a diameter corresponding to the installation space and may be provided to have a predetermined weight.

Therefore, the ball 34 may move in various directions such as forward and rearward directions and leftward and rightward directions and the like according to a change in the inclination of the vehicle while being installed inside the sensor housing 33, thereby sensing the change in the inclination.

The sensor lever 35 may rotate about one end thereof coupled to the sensor housing 33 in leftward and rightward directions by movement of the ball 34 in leftward and rightward directions according to a change in the inclination of the vehicle while being mounted on an upper portion of the ball 34.

The sensor lever 35 may include a mounting part 36 mounted on an upper portion of the ball 34, a lever coupling part 37 provided on an upper portion of the mounting part 36 and coupled to the pilot lever 41, and a shaft coupling part 38 extending to one side from the lever coupling part 37 and coupled to the sensor housing 33 by means of a shaft.

The mounting part 36 may be formed in a substantially circular disk shape, and a lower surface of the mounting part 36 may be curved to be upwardly concave to correspond to an upper end of the ball 34.

The lever coupling part 37 may extend upward from an upper surface of the mounting part 36.

The lever coupling part 37 may be formed in a substantially cylindrical shape to provide a space to which a spherical part 43 formed at a leading end of the pilot lever 41 is coupled.

That is, the pilot lever 41 may include a body part 42 slidably coupled to the through-hole part 323 of the cover 32, the spherical part 43 inserted into the space inside the lever coupling part 37, and a connection part 44 connecting the body part 42 and the spherical part 43.

The body part 42 may formed in a substantially '⊥L' shape in cross section so as to correspond to a shape of a through-hole formed in the through-hole part 323. Therefore, the pilot lever 41 is coupled to the sensor lever 35, but does not rotate with the sensor lever 35 even when the sensor lever 35 rotates in the forward and rearward directions along with the sensor housing 33.

The connection part 44 may be formed in a substantially bar shape that has a smaller width and height than the width and height of the body part 42.

Therefore, the inner space of the lever coupling part 37 may be formed with an inner diameter that is the same as or slightly larger than an outer diameter of the spherical part 43 of the pilot lever 41.

In addition, a slit 371 to which the connection part 44 of the pilot lever 41 is rotatably coupled is cut downward by a preset length at an upper end of the lever coupling part 37.

The shaft coupling part 38 may extend to one side from the lever coupling part 37 and the mounting part, downward to the right side when viewed in FIG. 6, and a shaft coupling hole 381 may be formed at a lower end of the shaft coupling part 38 to allow a rotating shaft 382 to be coupled thereto.

Herein, a withdrawing hole 334 may be formed on the sensor housing 33 to withdraw the shaft coupling part 38 to an outside, and a pair of shaft support parts 335 may be provided at both sides of the withdrawing hole 334, that is, front and rear sides, respectively, such that both ends of the rotating shaft 382 are coupled to and supported on the shaft support parts.

Meanwhile, the shaft coupling part 38 may be formed in an arc shape to be convex toward the lower right from the lever coupling part 37 and the mounting part 36 or may be inclined to correspond to the shape of the ball.

The sensor lever 35 configured as described above may perform a rotation action in leftward and rightward directions with reference to the rotating shaft 382 according to movement of the ball 34 in all directions, that is, forward and rearward directions and leftward and rightward directions and upward direction. Therefore, the pilot lever 41 coupled to an upper end of the sensor lever 35 may linearly reciprocate in leftward and rightward directions by the rotation action of the sensor lever 35.

As described above, the vehicle sensor device according to the disclosure may maintain a connection between the spherical part of the pilot lever and the lever coupling part of the sensor lever even when the sensor housing coupled to the body rotates in response to a change in inclination of a backrest of a seat, so that a normal operation is possible in all angle ranges of the backrest.

Hereinafter, an operating method of the vehicle sensor device according to a preferred embodiment of the present disclosure will be described in detail with reference to FIGS. 7 to 10.

Figure 7:
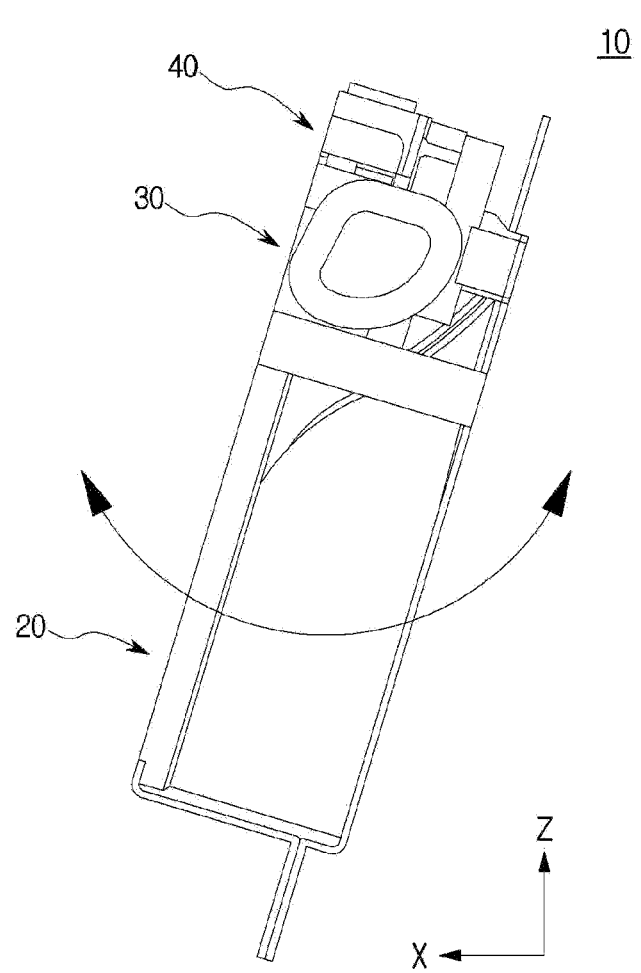
FIG. 7 is a view illustrating an operation state to explain a rotation action of the retractor in which the sensor device is installed.
Figure 8:
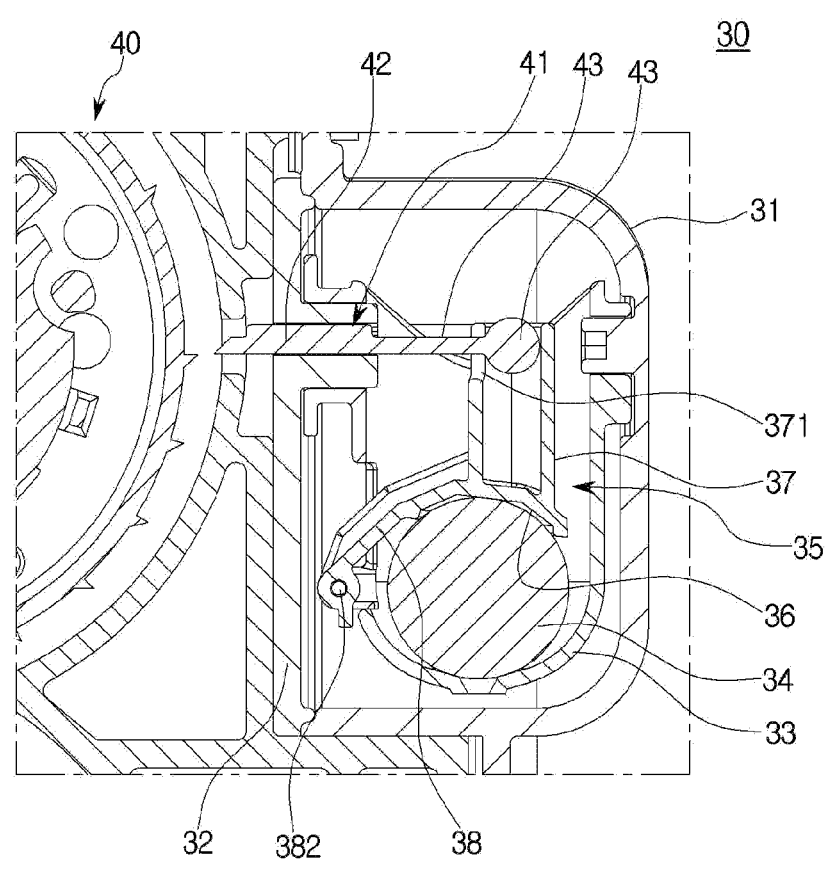
FIG. 8 is a cross-sectional view of the sensor device installed in the retractor.
Figure 9:
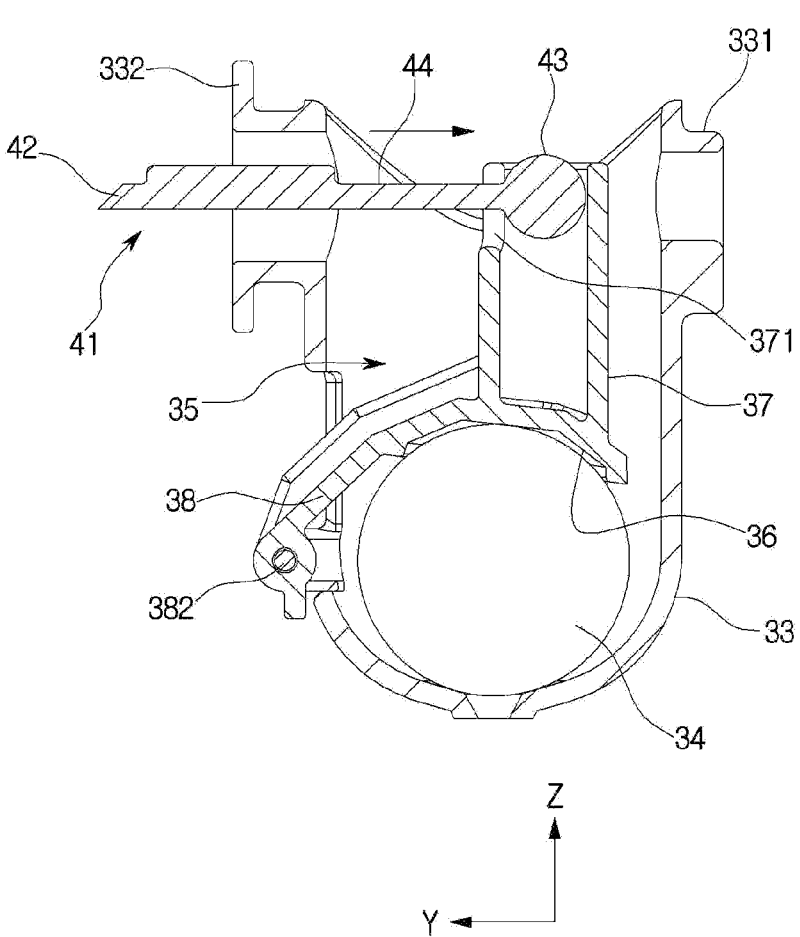
FIGS. 9 and 10 are views illustrating an operation state to explain a rotation action of a sensor lever according to movement of a ball, respectively.
Figure 10:
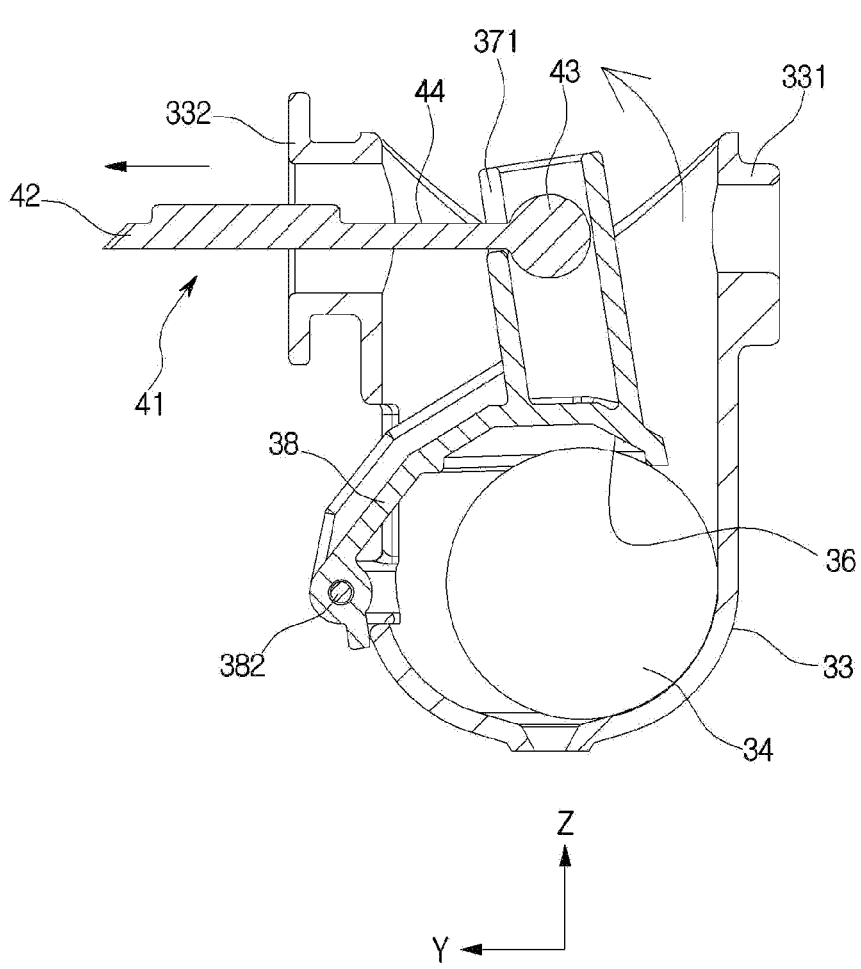

FIG. 7 is a view illustrating an operation state to explain a rotation action of the retractor in which the sensor device is installed, and FIG. 8 is a cross-sectional view of the sensor device installed in the retractor. In addition, FIGS. 9 and 10 are views illustrating an operation state to explain a rotation action of the sensor lever according to movement of the ball, respectively.

As shown in FIGS. 7 and 8, the sensor device 30 may rotate in forward and rearward directions by a forward and reward rotation action of the backrest while being installed in the retractor 10.

That is, the retractor 10 may rotate by about 10° in a forward direction according to a forward rotation action of the backrest, and may rotate by about 90° to the maximum in a rearward direction according to a rearward rotation action of the backrest.

Therefore, the body 31 and the cover 32 of the sensor device 30 may rotate by about 10° in the forward direction and may rotate by about 90° to the maximum according to the forward and rearward rotation action of the backrest and the retractor 10.

In this case, the sensor housing 33 which is rotatably installed inside the sensor device 30 may always remain vertically positioned.

That is, the sensor housing 33 and the ball 34 and the sensor lever 35 installed therein may rotate about the first and second coupling parts 331, 332 inside the body 31 and the cover 32, thereby constantly maintaining its upright position.

Meanwhile, as shown in FIG. 9, the mounting part 36 of the sensor lever 35 may be mounted on an upper portion of the ball 34 before the inclination of the vehicle is changed, and may maintain a horizontal state.

Accordingly, the pilot lever 41 having the spherical part 43 coupled to an upper end of the body part 37 moves to the body 31 from the cover 32, that is, to the left, and is maintained in this state.

When the pilot lever 41 moves to the left as described above, the pilot lever 41 and the locking device 40 are disengaged from each other, so that the webbing 21 may be freely pulled out.

On the other hand, when the inclination of the vehicle changes and the ball 34 moves to one side, for example, to the left as shown in FIG. 10, the sensor lever 35 rotates about the rotating shaft 382 coupled to the sensor housing 33 in the counter clockwise direction, thereby moving the pilot lever 41 to the right.

That is, the pilot lever 41 coupled to the upper end of the sensor lever 35 passes through the through-hole part 323 formed on the cover 32, and moves to the outside of the cover 32, that is, to the right, and protrudes therefrom.

As described above, when the pilot lever 41 protrudes to the outside of the cover 32, the right end of the pilot lever 41 is engaged with any one of a plurality of protrusions formed on an outer circumference of a steering disk of the locking device 40, so that the locking device 40 performs a locking operation to prevent the webbing 21 from being pulled out.

As described above, the disclosure may sense changes in inclination and acceleration of a vehicle and change in inclination of a backrest by using the ball and the sensor housing, and may control the pilot lever by rotating the sensor lever.

That is, according to the disclosure, the sensor lever may be installed on an upper portion of the ball, and, by rotating the sensor lever about the rotating shaft coupled to the sensor housing by movement of the ball according to changes in acceleration and inclination of the vehicle, the pilot lever connected with the sensor lever may be linearly reciprocated.

Accordingly, the disclosure may control the ability to pull out the webbing by making the pilot lever protrude to the outside of the cover and engaging or disengaging the pilot lever to or from the locking device.

In particular, according to the disclosure, the spherical part may be provided on the pilot lever, and may be rotatably coupled to an upper portion of the sensor lever, so that the pilot lever may be normally controlled to linearly reciprocate regardless of an angle at which the sensor device is rotated and disposed by adjusting an angle of the seat backrest.

That is, according to the disclosure, the pilot lever may be normally controlled according to an arrangement angle of the sensor device which is changed by adjusting an angle of a backrest of a seat within a range from 10° in a forward direction to 90° in a rearward direction, or from 90° in a forward direction to 90° in a rearward direction with reference to a reference position.

Although the invention made by the inventors of the present application has been specifically described according to the above embodiments, the present disclosure is not limited to the above embodiments, and may be modified variously within a scope of the technical essence of the disclosure.

INDUSTRIAL APPLICABILITY

The disclosure is applied to a seat belt retractor technology that installs a sensor lever in a sensor device for sensing changes in acceleration and inclination of a vehicle, and moves a pilot lever connected with the sensor lever by rotating the sensor lever about a rotating shaft coupled to a sensor housing by movement of a ball according to changes in acceleration and inclination of the vehicle.

The invention claimed is:

1. A vehicle sensor for sensing changes in inclination and acceleration of a vehicle, the vehicle sensor comprising:

a body that forms an external appearance;

a cover coupled to an opened one surface of the body;

a sensor housing rotatably installed in the body according to an installation angle of the body and an inclination of a backrest, such that the sensor housing is configured to rotate in response to a change in the inclination of the backrest;

a ball installed inside the sensor housing to sense changes in the inclination and acceleration of the vehicle; and a sensor lever disposed on an upper portion of the ball and having one end rotatably coupled to the sensor housing, the sensor lever maintaining an upright position in response to the change in the inclination of the backrest, wherein the sensor lever linearly reciprocates a pilot lever provided in a locking device by a rotation action according to movement of the ball;

wherein the sensor lever includes:

a mounting part mounted on the ball;

a lever coupling part provided on the mounting part and coupled to the pilot lever; and a shaft coupling part extending to one side from the lever coupling part and coupled to the sensor housing, and wherein, when the ball moves to one side according to the change in inclination and acceleration of the vehicle, the lever coupling part rotates about a rotating shaft coupled to the sensor housing to move the pilot lever to an outside of the cover;

wherein the pilot lever includes:

a body part slidably coupled to a through-hole formed in the cover;

a spherical part inserted into a space inside the lever coupling part; and a connection part connecting the body part and the spherical part, and wherein a slit to which the connection part of the pilot lever is rotatably coupled is cut downward by a preset length at an upper end of the lever coupling part.

2. The vehicle sensor of claim 1, wherein the sensor housing is formed in a cylindrical shape with an opened upper surface so that an installation space is formed in the sensor housing and the ball is installed in the installation space to move according to the change in inclination and acceleration of the vehicle, the sensor housing is provided at both sides thereof with first and second coupling parts rotatably coupled to the body and the cover, a withdrawing hole is formed at one side of the sensor housing to withdraw the shaft coupling part to an outside, and a pair of shaft support parts are provided at both sides of the withdrawing hole such that both ends of the rotating shaft are coupled to and supported on the shaft support parts.

3. The vehicle sensor of claim 2, wherein the body is provided at an inner surface thereof with a rotating shaft part coupled to the first coupling part and an angle limiting part for limiting a rotation angle of the sensor housing in forward and rearward directions, a fixing protrusion is formed on the first coupling part, the angle limiting part includes a first stopper for limiting a forward rotation angle of the fixing protrusion and a second stopper for limiting a rearward rotation angle of the fixing protrusion, and positions of the first and second stoppers are set in correspondence with a rotation angle of a backrest of a seat.

4. The vehicle sensor of claim 1, wherein the vehicle sensor maintains a connection between the pilot lever and the sensor lever even when the sensor housing coupled to the body rotates in response to the change in inclination of the backrest of a seat, so that a normal operation is possible in all angle ranges of the backrest.

5. A seat belt retractor equipped with the vehicle sensor, the seat belt retractor comprising:

the vehicle sensor having a configuration according to claim 1 to sense changes in inclination and acceleration of the vehicle;

a spindle device having a spindle on which a seat belt webbing is wound; and the locking device that performs a locking operation to prevent the seat belt webbing from being pulled out upon vehicle collision, wherein the pilot lever is linearly reciprocated to allow the pilot lever to be engaged with or disengaged from the locking device according to the sensed change in inclination and acceleration of the vehicle.

6. A seat belt retractor equipped with the vehicle sensor, the seat belt retractor comprising:

the vehicle sensor having a configuration according to claim 4 to sense changes in inclination and acceleration of the vehicle;

the spindle device having the spindle on which the seat belt webbing is wound; and the locking device that performs the locking operation to prevent the seat belt webbing from being pulled out upon vehicle collision, wherein the pilot lever is linearly reciprocated to allow the pilot lever to be engaged with or disengaged from the locking device according to the sensed change in inclination and acceleration of the vehicle.

7. A seat belt retractor equipped with the vehicle sensor, the seat belt retractor comprising:

the vehicle sensor having a configuration according to claim 5 to sense changes in inclination and acceleration of the vehicle;

the spindle device having the spindle on which the seat belt webbing is wound; and the locking device that performs the locking operation to prevent the seat belt webbing from being pulled out upon vehicle collision, wherein the pilot lever is linearly reciprocated to allow the pilot lever to be engaged with or disengaged from the locking device according to the sensed change in inclination and acceleration of the vehicle.

8. A seat belt retractor equipped with the vehicle sensor, the seat belt retractor comprising:

the vehicle sensor having a configuration according to claim 6 to sense changes in inclination and acceleration of the vehicle;

the spindle device having the spindle on which the seat belt webbing is wound; and the locking device that performs the locking operation to prevent the seat belt webbing from being pulled out upon vehicle collision, wherein the pilot lever is linearly reciprocated to allow the pilot lever to be engaged with or disengaged from the locking device according to the sensed change in inclination and acceleration of the vehicle.

* * * * *